United States Patent
Nezaki

(10) Patent No.: US 7,922,195 B2
(45) Date of Patent: Apr. 12, 2011

(54) VEHICLE OCCUPANT RESTRAINT SYSTEM

(75) Inventor: Takuya Nezaki, Mizunami (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 15 days.

(21) Appl. No.: 12/561,563

(22) Filed: Sep. 17, 2009

(65) Prior Publication Data

US 2010/0109302 A1    May 6, 2010

(30) Foreign Application Priority Data

Nov. 5, 2008    (JP) ................ 2008-284084

(51) Int. Cl.
*B60R 21/18* (2006.01)
*B60R 22/12* (2006.01)

(52) U.S. Cl. ............... 280/733; 280/730.1; 280/801.1; 280/808; 297/470; 297/484

(58) Field of Classification Search .............. 280/733, 280/801.1, 728.1, 730.1, 736, 742, 808; 180/268; 297/484, 470, 471, 473, 468
See application file for complete search history.

(56) References Cited

U.S. PATENT DOCUMENTS

| | | | | |
|---|---|---|---|---|
| 3,820,842 A | * | 6/1974 | Stephenson | 280/733 |
| 3,905,615 A | * | 9/1975 | Schulman | 280/730.1 |
| 5,319,806 A | * | 6/1994 | Hermann et al. | 2/461 |
| 6,705,641 B2 | * | 3/2004 | Schneider et al. | 280/733 |
| 6,729,428 B2 | * | 5/2004 | Jitsui | 180/268 |
| 6,837,547 B2 | * | 1/2005 | Delventhal et al. | 297/484 |
| 7,552,969 B2 | * | 6/2009 | Maciejczyk | 297/250.1 |
| 7,665,761 B1 | * | 2/2010 | Green et al. | 280/733 |
| 2009/0236828 A1 | * | 9/2009 | Foubert et al. | 280/728.2 |
| 2009/0256337 A1 | * | 10/2009 | Pan | 280/733 |
| 2010/0156084 A1 | * | 6/2010 | Nezaki | 280/806 |

FOREIGN PATENT DOCUMENTS

| | | | |
|---|---|---|---|
| DE | 19902288 A1 | * | 7/2000 |
| JP | 510127 U | | 2/1993 |
| JP | 2000016237 A | | 1/2000 |
| JP | 3079587 U | | 6/2001 |
| JP | 2008100649 A | | 5/2008 |

* cited by examiner

*Primary Examiner* — Paul N Dickson
*Assistant Examiner* — James English
(74) *Attorney, Agent, or Firm* — Gifford, Krass, Sprinkle, Anderson & Citkowski, P.C.

(57) ABSTRACT

A vehicle occupant restraint system includes left and right inflating belts which are formed long in the vertical direction of a seat and in a belt shape enabling an occupant to be restrained; a first slider which is supported on an outer end side in the seat width direction by a support portion of one of the inflating belts in a manner to be slidable in the longitudinal direction of the one inflating belt, and which retains an engaging member on an inner end side in the seat width direction; and a second slider which is supported on an outer end side in the seat width direction by a support portion of the other inflating belt in a manner to be slidable in the longitudinal direction of the other inflating belt, and which retains an engageable member on an inner end side in the seat width direction.

4 Claims, 7 Drawing Sheets

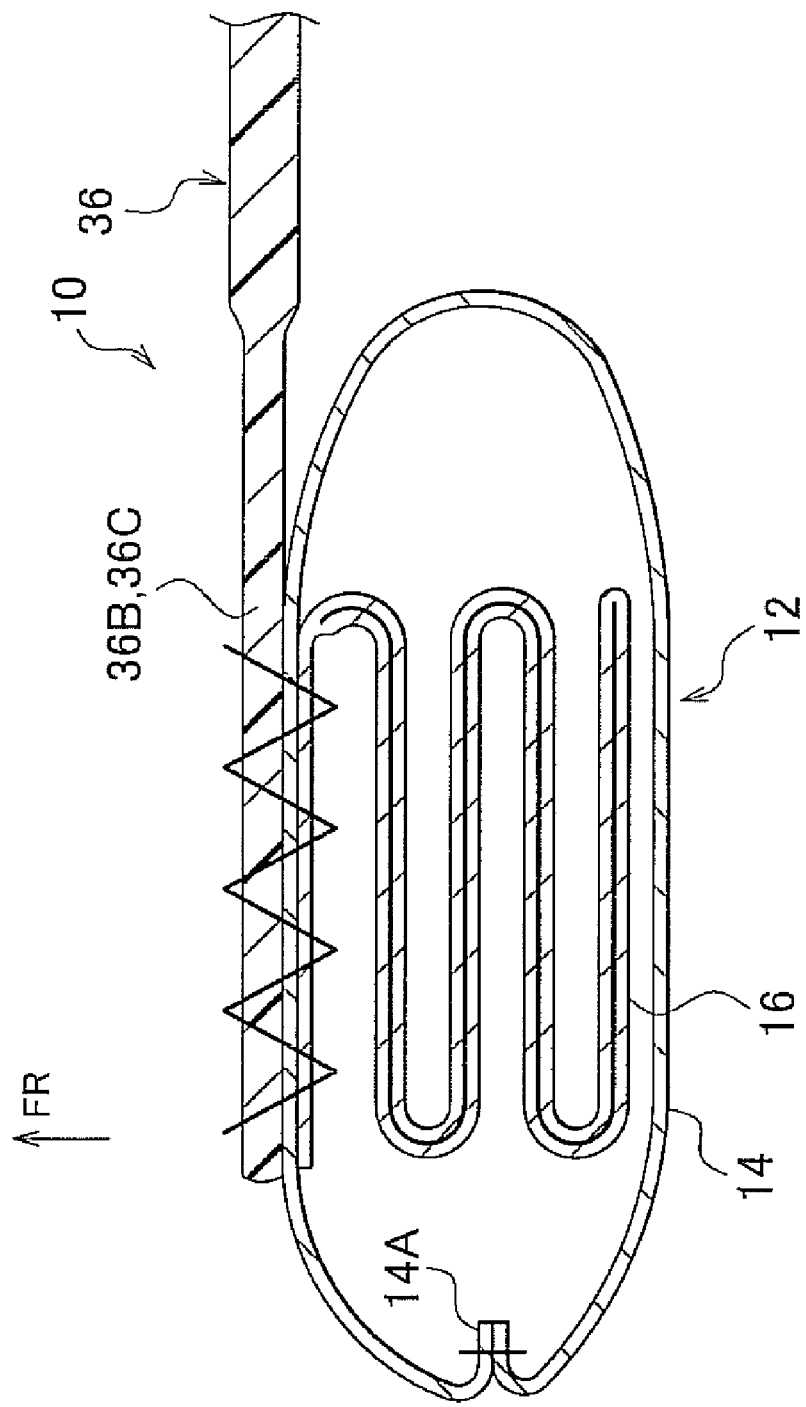

US 7,922,195 B2

VEHICLE OCCUPANT RESTRAINT SYSTEM

INCORPORATION BY REFERENCE

The disclosure of Japanese Patent Application No. 2008-284084 filed on Nov. 5, 2008, including the specification, drawings and abstract is incorporated herein by reference in its entirety.

BACKGROUND OF THE INVENTION

1. Field of the Invention

The invention relates to a vehicle occupant restraint system for restraining an occupant seated in a seat, in the seat at least during a collision.

2. Description of the Related Art

Japanese Patent Application Publication No. 2008-100649 (JP-A-2008-100649), for example, describes an occupant restraint system that includes an inflatable first belt, a non-inflatable second belt, a non-inflatable third belt, and a tongue. One end of the second belt is continuous with the first belt and the other end of the second belt is connected to a retractor. Both ends of the third belt are connected to the first belt at locations apart from one another in the longitudinal direction of the first belt so as to straddle the middle portion of the first belt. The tongue is able to engage and disengage with respect to a buckle device, and is slidably provided on the third belt, with the third belt passing through the tongue so that the tongue is able to move along the third belt.

However, JP-A-2008-100649 does not consider the fit on the wearer when applied to a four-point air belt system, so there is room for improvement on this point.

SUMMARY OF THE INVENTION

This invention thus provides a vehicle occupant restraint system in which an engaging member of a connecting portion for connecting the middle portions of left and right inflating belts together is able to be easily engaged with an engageable member, and the left and right inflating belts fit well.

One aspect of the invention relates to a vehicle occupant restraint system that includes left and right inflating belts, a connecting portion, a first slider, and a second slider. Each of the left and right inflating belts is formed long in the vertical direction of a seat and in a belt shape enabling an occupant to be restrained, and inflates by receiving a supply of gas. The connecting portion includes an engaging member and an engageable member, and connects the middle portions of the left and right inflating belts together. The first slider is supported on an outer end side in the seat width direction by a support portion of one of the inflating belts in a manner so as to be able to slide in the longitudinal direction of the one inflating belt, and retains the engaging member on an inner end side in the seat width direction. The second slider is supported on an outer end side in the seat width direction by a support portion of the other inflating belt in a manner so as to be able to slide in the longitudinal direction of the other inflating belt, and retains the engageable member on an inner end side in the seat width direction.

With the vehicle occupant restraint system according to this aspect, a seated occupant wears the inflating belts with the middle portions of the left and right belts in the longitudinal (i.e., vertical) direction connected together by engaging the engaging member of the connecting portion with the engageable member. That is, the portions of the inflating belts that are above the connecting portion mainly restrain the upper body of the occupant, while the portions of the inflating belts that are below the connecting portion mainly restrain the pelvic area (i.e., the waist) of the occupant. In the event of a vehicle collision, for example, gas is supplied to the inflating belts, which causes them to inflate, thus effectively protecting the occupant.

In this case, with the vehicle occupant restraint system according to the aspect described above, the engaging member and the engageable member are supported on the inflating belts via the first and second sliders that are able to slide in the longitudinal direction of the inflating belts. Therefore, the position where the connecting portion is connected in the vertical direction of the seat may be adjusted by sliding the first and second sliders.

In this way, the vehicle occupant restraint system of the invention according to the aspect described above is advantageous in that the engaging member of the connecting portion for connecting the middle portions of the left and right inflating belts together is able to be easily engaged with an engageable member, and the left and right inflating belts fit well.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 4 is a sectional view of the attachment structure of a slide guide which constitutes part of the four-point air belt system according to the first example embodiment of the invention;

DETAILED DESCRIPTION OF EMBODIMENTS

Figure 1:
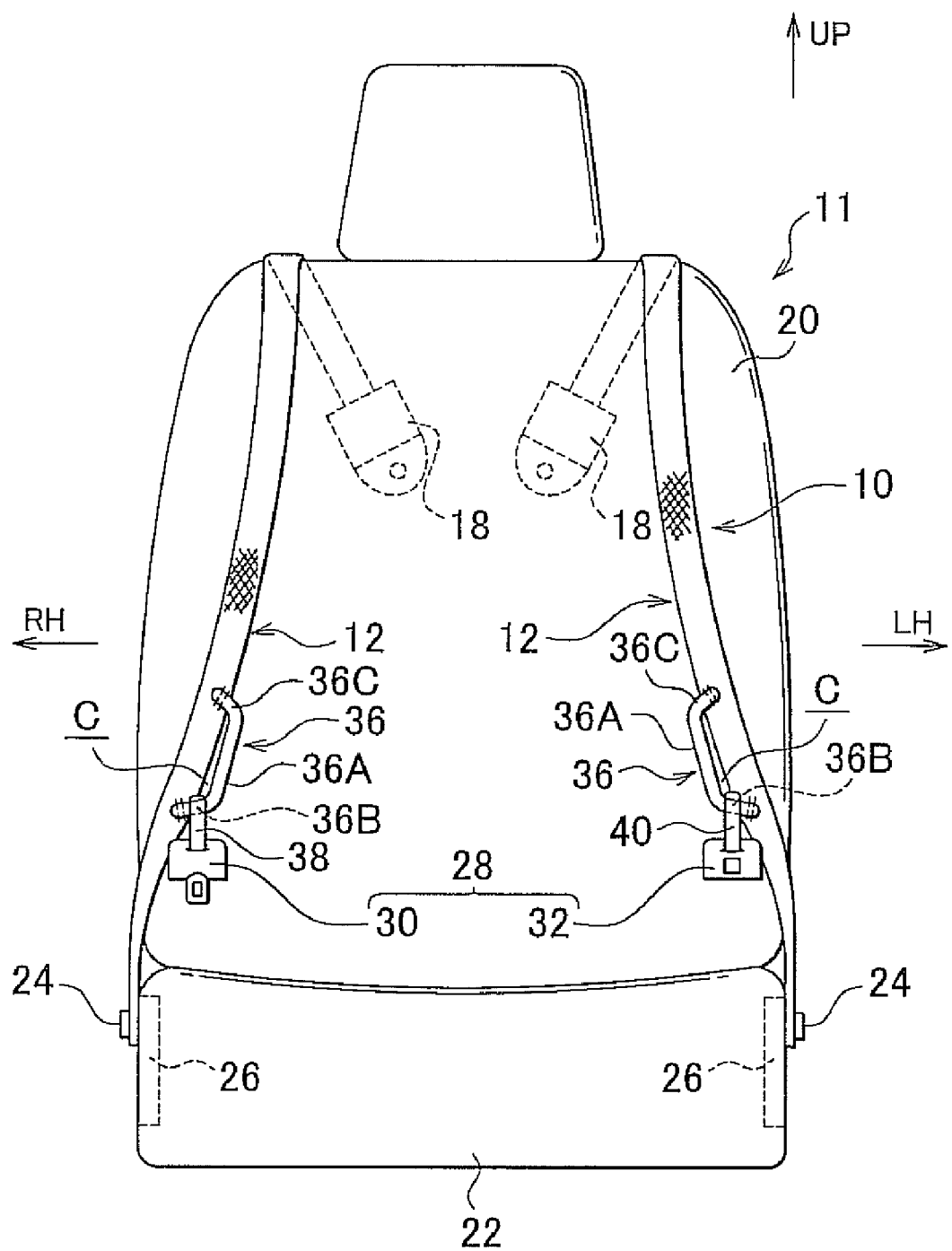
FIG. 1 is a front view showing a frame format of a four-point air belt system according to a first example embodiment of the invention as it appears when unfastened.

A four-point air belt system 10 as the vehicle occupant restraint system according to a first example embodiment of the invention will now be described with reference to FIGS. 1 to 4. Incidentally, in the drawings, the arrow labeled FR indicates the forward direction (i.e., the direction of travel) of a vehicle provided with this four-point air belt system 10, which is the generally the same as the forward direction of a vehicle seat (hereinafter simply referred to as "seat") 11 to which the four-point air belt system 10 is applied. Also, the arrow labeled UP indicates the upward direction with respect to the vehicle, which is generally the same as the upward direction of the seat 11, the arrow labeled RH indicates the right hand side in the width direction of the vehicle, which is the generally same as the right hand side in the width direction of the seat 11, and the arrow labeled LH indicates the left hand side in the width direction of the vehicle, which is generally the same as the left hand side in the width direction of the seat 11.

Figure 2:
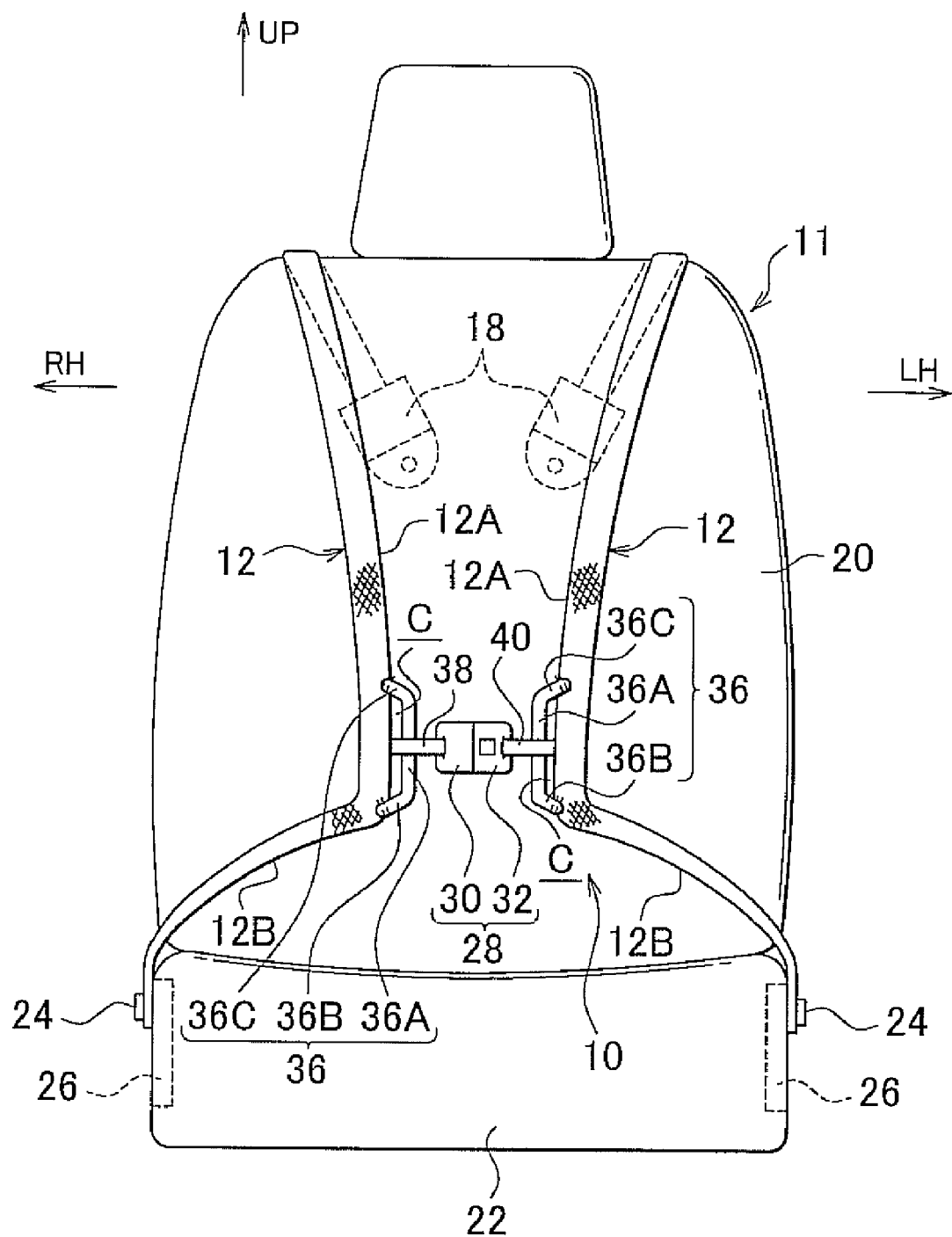
FIG. 2 is a front view showing a frame format of the four-point air belt system according to the first example embodiment of the invention as it appears when fastened.

FIG. 1 is a front view showing a frame format of the four-point air belt system 10 applied to the seat 11, as it appears when unfastened, and FIG. 2 is a front view showing a frame format of the four-point air belt system 10 applied to the seat 11, as it appears when fastened (the occupant is not shown in the drawing). As shown in these drawings, the four-point air belt system 10 includes air belts 12 which are a pair of left and right inflating belts. Each of the air belts 12 is structured such that an air bag 16 which inflates by receiving a supply of gas is housed in a belt main body 14, as shown in FIG. 4. Incidentally, the belt main body 14 is formed in a general pouch shape. Although not shown, the air bag 16 may be covered by an expandable mesh belt so as to be kept in a predetermined folded shape.

The upper end of each air belt 12 is wound around a retractor 18 so as to be able to be extended and retracted. The air bag 16 of each air belt 12 is housed in the belt main body (the air bag cover) 14 up to a portion just above the retractor 18 when the air belts 12 are not being used (i.e., when they are completely retracted). That is, the air bag 16 is not provided in the portion of the air belt 12 that is wound up on the retractor 18. In this example embodiment, the retractor 18 is housed in a seatback 20 that forms part of the seat 11.

Meanwhile, the lower end of each air belt 12 is rotatably supported so as to be able to rotate about an axis along the seat width direction via an anchor 24 at the rear portion of a seat cushion 22 that forms part of the seat 11. Also, two inflators 26, one for each air belt 12, are arranged in the seat cushion 22. Upon being activated by a control apparatus, not shown, each inflator 26 produces a large amount of gas which it supplies to the corresponding air bag 16. The control apparatus activates the inflators 26 at times such as when a frontal collision of a vehicle provided with the four-point air belt system 10 is detected or predicted, for example.

Also, the four-point air belt system 10 includes a buckle device 28 that serves as a connecting portion for connecting the middle portions of the left and right air belts 12 in the longitudinal direction together. This buckle device 28 has two main portions, i.e., a tongue plate 30 that serves as an engaging member, and a buckle 32 that serves as an engageable member. The four-point air belt system 10 is fastened (i.e., worn by an occupant) as shown in FIG. 2 by engaging the tongue plate 30 of the buckle device 28 with the buckle 32.

In this example embodiment, the portion of each air belt 12 that is above the portion that is connected by the buckle device 28 is designated as a shoulder belt portion 12A that restrains mainly the upper body of the occupant, and the portion of each air belt 12 that is below the portion that is connected by the buckle device 28 is designated as a lap belt portion 12B that restrains mainly the pelvic area of the occupant. Although not shown, in this example embodiment, the portion of the air bag 16 that inflates at the shoulder belt portion 12A is integrally formed with the portion of the air bag 16 that inflates at the lap belt portion 12B, so both portions of a given air belt 12 receive a supply of gas from the same inflator 26 and thus inflate and deploy together.

With the four-point air belt system 10, the tongue plate 30 which makes up part of the buckle device 28 is slidably supported on one air belt 12 so that it can slide (i.e., be relatively displaced) in the longitudinal direction of that air belt 12, and the buckle 32 which makes up the other part of the buckle device 28 is slidably supported on the other air belt 12 so that it can slide (i.e., be relatively displaced) in the longitudinal direction of that air belt 12. This will now be described in more detail.

A slide guide 36 is attached to the middle portion in the longitudinal direction of each air belt 12. Each slide guide 36 has three main portions, i.e., a guide main body 36A that is parallel to the inside, in the seat width direction, of the corresponding air belt 12, a lower connecting portion 36B that extends from the lower end of the guide main body 36A toward the air belt 12, and an upper connecting portion 36C that extends from the upper end of the guide main body 36A toward the air belt 12. The tip ends of the upper and lower connecting portions 36B and 36C of each slide guide 36 are sewn on to the air belt 12, such that a space C is formed between the guide main portion 36A and the air belt 12.

Incidentally, with respect to the slide guides 36 being sewn on to the air belts 12, as shown in FIG. 4, the lower connecting portion 36B and the upper connecting portion 36C are sewn to both the belt main body 14 and the air bag 16, with the belt main body 14 and the air bag 16 overlapping each other on the side of the air belt 16 that is opposite the occupant (i.e., on the front side in the longitudinal direction of the vehicle). Accordingly, the air bag 16 is retained in a predetermined position with respect to the belt main body 14.

Also, the belt main body 14 is formed in a pouch shape, as described above, by portions in the circumferential direction being sewn together. This sewn portion 14A is designed to tear when the air bag 16 inflates and deploys. The sewn portion 14A is at an end portion in the width direction of the air belt 12, and is arranged so as not to overlap with the sewn portions of the lower and upper connecting portions 36B and 36C of the belt main body 14.

The four-point air belt system 10 includes a first slider 38 and a second slider 40. The first slider 38 is slidably supported (i.e., guided) in the longitudinal direction of the guide main body 36A (i.e., the air belt 12) on the slide guide 36 on the right, and retains the tongue plate 30 of the buckle device 28. The second slider 40 is slidably supported in the longitudinal direction of the guide main body 36A on the slide guide 36 on the left, and retains the buckle 32.

Figure 5:
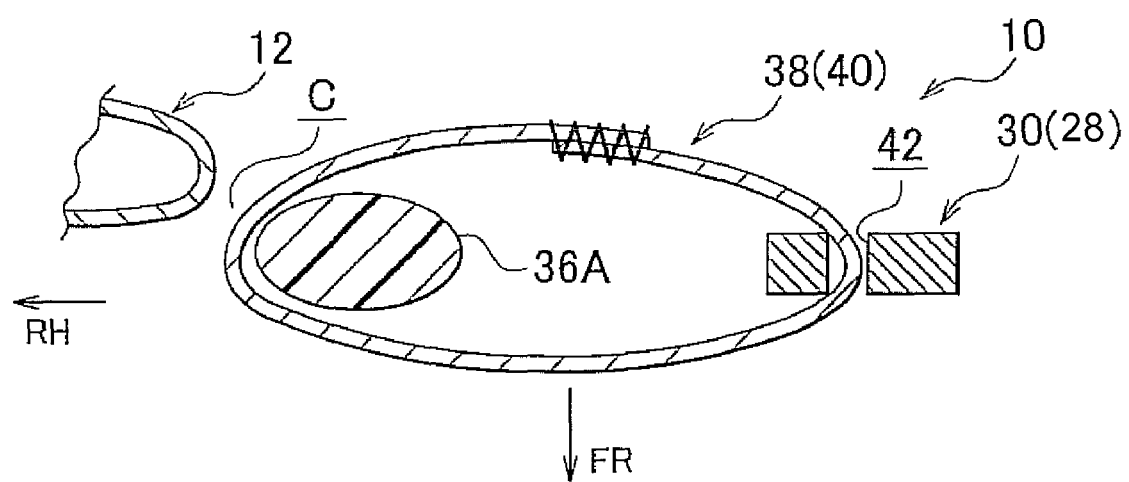
FIG. 5 is a diagram of the slider, which constitutes part of the four-point air belt system according to the first example embodiment of the invention, as viewed from the direction in which it slides (i.e., as viewed from above)

Each of the sliders 38 and 40 is formed in a general ring shape by connecting the ends of a band-shaped member in the longitudinal direction together, as shown in FIG. 5. In this example embodiment, the first slider 38 is passed through a slit 42 in the tongue plate 30 and the space C between the corresponding air belt 12 and guide main body 36A, and then the ends of the first slider 38 are sewn together. Similarly, the second slider 40 is passed through a slit 42 in the buckle 32 and the space C between the corresponding air belt 12 and guide main body 36A, and then the ends of the second slider 40 are sewn together.

Figure 3A:
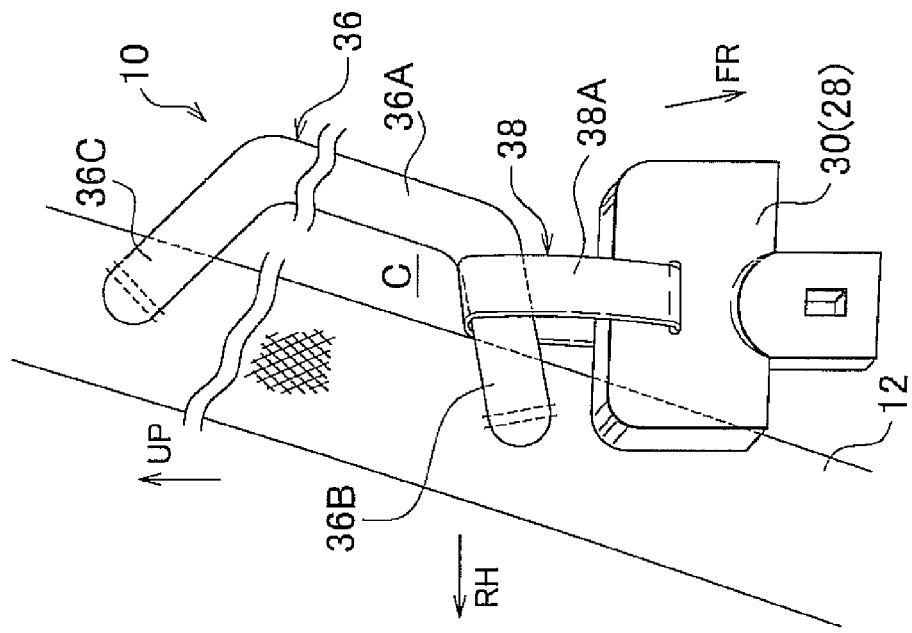
FIG. 3A is a perspective view of a slider which constitutes part of the four-point air belt system according to the first example embodiment of the invention as it appears in the fastened position (or the position when it is about to be fastened)

Accordingly, the first slider 38 is looped around the corresponding guide main body 36A so as to be able to slide in the longitudinal direction while retaining the tongue plate 30, as shown in FIG. 3A. Although not shown in the drawing, the second slider 40 is looped around the corresponding guide main body 36A so as to be able to slide in the longitudinal direction while retaining the buckle 32.

Each of the sliders 38 and 40 is looped around the corresponding guide main body 36A, as described above. Therefore, when the tongue plate 30 and the buckle 32 are fastened together (as well as just before they are fastened together), the front face 38A of the first slider 38 and the front face of the second slider 40 face forward (i.e., away from the occupant) in the longitudinal direction of the seat 11, and the back face 38B of the first slider 38 and the back face of the second slider 40 face the occupant. In other words, the direction of thickness (which may also be understood as the thickness of the band-shaped member) is generally the same as the longitudinal direction of the seat 11 at least when (as well as just before) the tongue plate 30 and the buckle 32 are fastened together.

Figure 3B:
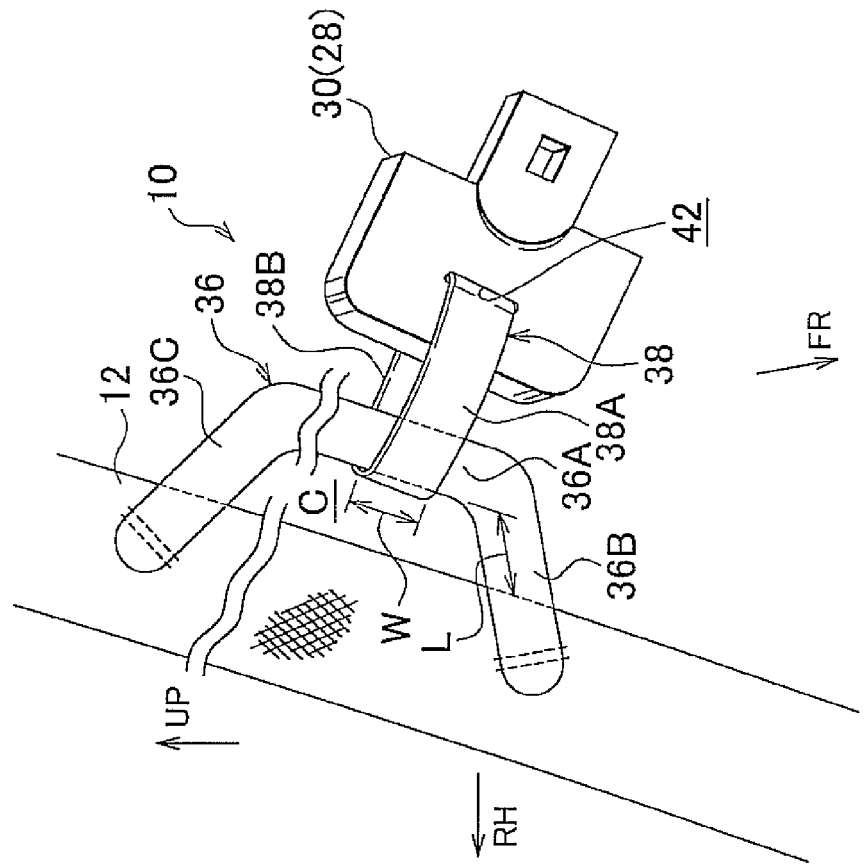
FIG. 3B is a perspective view of the slider which constitutes part of the four-point air belt system according to the first example embodiment of the invention as it appears hanging when unfastened.

Also, with the four-point air belt system 10, the length L (see FIG. 3A) of the lower connecting portion 36B of the slide guide 36 that is facing the space C is greater than the width W of the first slider 38 (second slider 40). Therefore, with the four-point air belt system 10, when the air belt 12 is not being used, i.e., not being worn, the first slider 38 (second slider 40) is able to hang from the lower connecting portion 36B, as shown in FIG. 3B. Accordingly, in this example embodiment, the thickness direction of the first slider 38 and the second slider 40 is generally the same as the longitudinal direction of the seat 11 even when the air belt 12 is not being used.

Next, the operation of the first example embodiment will be described.

With the four-point air belt system 10 structured as described above, when an occupant seated in the seat 11 fastens the air belts 12 together, the occupant holds the tongue plate 30 and the buckle 32 of the buckle device 28 with his or her right and left hands and pulls them in front of his or her abdomen. As the tongue plate 30 and the buckle 32 are pulled in front of the abdomen of the seated occupant, the upper portion of each air belt 12 reels out (i.e., extends) from the corresponding retractor 18. When the seated occupant fastens the tongue plate 30 to the buckle 32 and then lets go of the tongue plate 30 and the buckle 32, the retractor 18 takes up the slack in the air belts 12 so that the air belts 12 fit the seated occupant properly.

If a frontal collision of a vehicle provided with the four-point air belt system 10 is detected or predicted, for example, the control apparatus activates the inflators 26. Accordingly, as the air bag 16 inflates, the belt main body 14 of each air belt 12 tears at the sewn portion 14A and the air bag 16 inflated with the gas supplied by the inflator 26 deploys in a predetermined shape. The seated occupant is effectively restrained in the seat 11 by a pretensioner effect that is based on the overall length of the air belt 12 becoming shorter as the air bag 16 inflates. Also, the seated occupant is also protected by the cushioning effect from the deployed air bag 16.

On the other hand, when taking the air belt 12 off under normal circumstances (i.e., without a collision having occurred), the seated occupant unfastens the tongue plate 30 and the buckle 32, at which time the air belts 12 are retracted (i.e., wound up) by the winding force of the retractors 18. In this case, the left and right air belts 12 lie generally vertical, as shown in FIG. 1. The tongue plate 30 hangs on the first slider 38 from the corresponding slide guide 36 and the buckle 32 hangs on the second slider 40 from the corresponding slide guide 36.

Here, with the four-point air belt system 10, the tongue plate 30 is slidably supported in the longitudinal direction of the air belt 12 via the first slider 38, and the buckle 32 is slidably supported in the longitudinal direction of the air belt 12 via the second slider 40. Therefore, the position where the buckle device 28 is connected in the longitudinal direction of the left and right air belts 12 is able to be adjusted (i.e., changed). Accordingly, the left and right air belts 12 can be made to properly fit the occupant seated in the seat 11.

For example, with a structure in which the tongue plate 30 and the buckle 32 of the buckle device 28 are provided at predetermined positions on the air belts 12 and are unable to be relatively displaced in the longitudinal direction, lower retractors that are connected to the lower ends of the air belts 12 in a manner that enables the lower end sides of the air belts 12 to be extended and retracted must also be provided in addition to the retractors 18, in order to fasten the left and right air belts 12 together by the buckle device 28 at the proper position in the longitudinal direction. Furthermore, a structure in which the air belts 12 that house the air bags 16 slidably pass through the slits 42 in the tongue plate 30 and the buckle 32 has limitations. For example, the tongue plate 30 and the buckle 32 (i.e., the portions in which the slits 42 are formed) must be made larger, the air bags 16 end up being divided into upper and lower sections by the tongue plate 30 and the buckle 32, and the like.

In contrast, with the four-point air belt system 10 according to this example embodiment, the position where the left and right air belts 12 are connected by the buckle device 28 is able to be adjusted by sliding the tongue plate 30 and the buckle 32 in the longitudinal direction of the air belts 12, as described above. Therefore, a structure in which the lower ends of the air belts 12 are supported by the anchors 24 (i.e., a structure having only the retractors 18) still enables the left and right air belts 12 to fit a seated occupant properly, without being subject to the limitations described above.

With the four-point air belt system 10, the thickness direction of the first slider 38 and the second slider 40 at least just before the tongue plate 30 and the buckle 32 are fastened together is generally the same as the longitudinal direction of the seat 11, and the guide main bodies 36A and the slits 42 are positioned at opposite ends of the first slider 38 and the second slider 40. This prevents or effectively inhibits the tongue plate 30 from being fastened to (e.g., inserted into) the buckle 32 facing the wrong way (as well as prevents or effectively inhibits an attempt to fasten the tongue plate 30 to the buckle 32 with the tongue plate 30 facing the wrong way), for example. That is, with the four-point air belt system 10, the first slider 38 and the second slider 40 will not twist, so the left and right air belts 12 can be put on easily and properly by a seated occupant simply by fastening the tongue plate 30 to the buckle 30.

In this way, with the four-point air belt system 10 according to the first example embodiment of the invention, the tongue plate 30 of the buckle device 32 for connecting the middle portions of the left and right air belts 12 together can be easily and properly engaged with the buckle 32, and the left and right air belts 12 fit well.

Also, with the four-point air belt system 10, the first slider 38 and the second slider 40 are slidably looped around the corresponding guide main bodies 36A of the corresponding slide guides 36. Therefore, the sliding range of the first slider 38 and the second slider 40, i.e., the tongue plate 30 and the buckle 32, with respect to the air belts 12 is able to be limited to an appropriate range.

Furthermore, with the four-point air belt system 10, when the air belts 12 are not being worn, the tongue plate 30 and the buckle 32 hang on the first slider 38 and the second slider 40, respectively, from the lower connecting portions 36B of the slide guides 36, as shown in FIG. 3B. In addition, the lengths L of the lower connecting portions 36B of the slide guides 36 that face the space C are greater than the widths W of the first slider 38 and the second slider 40. Therefore, when the tongue plate 30 and the buckle 32 are hanging down as described above, the first slider 38 and the second slider 40 do not bunch up (i.e., become scrunched and wrinkle) so the appearance is nice. Also, the tongue plate 30 and the buckle 32 hang down in positions that make it easy for a seated occupant to grasp them.

Next, the other example embodiments of the invention will be described. Incidentally, parts and portions in these example embodiments that are basically the same as parts and portions in the first example embodiment described above will be denoted by the same reference characters that are used in the first example embodiment. In addition, those parts and portions may be omitted from the drawings and descriptions of those parts and portions may be omitted from the description.

Figure 6:
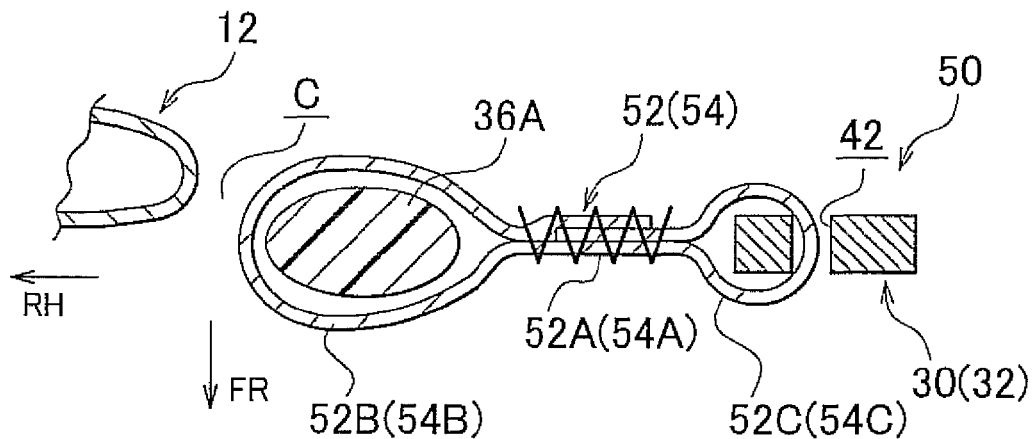
FIG. 6 is a diagram of a slider, which constitutes part of a four-point air belt system according to a second example embodiment of the invention, as viewed from the direction in which it slides (i.e., as viewed from above)

FIG. 6 is a plan view of a first slider 52 (second slider 54) that constitutes part of a four-point air belt system 50 that serves as the vehicle occupant restraint system according to the second example embodiment of the invention, which corresponds to FIG. 5. As shown in the FIG. 6, the four-point air belt system 50 differs from the four-point air belt system 10 having the first slider 38 and the second slider 40 which are on the whole ring-shaped in that the first slider 52 (second slider 54) serves as a connecting portion 52A (connecting portion 54A) where the portion that loops around the guide main body 36A is sewn to the portion that retains the tongue plate 30 (buckle 32).

More specifically, one end of the first slider 52 in the seat width direction serves as a slider portion 52B that is slidably looped around the guide main body 36A, and the other end of the first slider 52 in the seat width direction, i.e., the end of the first slider 52 in the seat width direction which is on the opposite side of the connecting portion 52A from the slider 52B, serves as a tongue retaining portion 52C that retains the tongue plate 30. Similarly, as shown in parentheses in FIG. 6, one end of the second slider 54 in the seat width direction serves as a slider portion 54B that is slidably looped around the guide main body 36A, and the other end of the second slider 54 in the seat width direction, i.e., the end of the second slider 54 in the seat width direction which is on the opposite side of the connecting portion 54A from the slider 54B, serves as a buckle retaining portion 54C that retains the buckle 32.

Accordingly, the first slider 52 and the second slider 54 are structured such that the thickness direction (which may also be understood as the thickness of the band-shaped member) is generally the same as the longitudinal direction of the seat at least when (and just before) the tongue plate 30 and the buckle 32 are fastened together.

Therefore, the four-point air bag system 50 of this second example embodiment is also able to obtain the same effects as the four-point air belt system 10 according to the first example embodiment by basically the same operation as that of the four-point air belt system 10.

Figure 7:
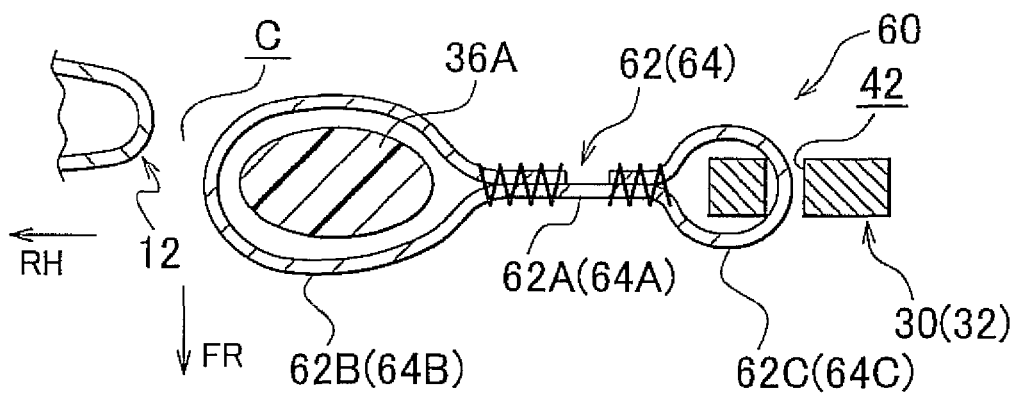
FIG. 7 is a diagram of a slider, which constitutes part of a four-point air belt system according to a third example embodiment of the invention, as viewed from the direction in which it slides (i.e., as viewed from above)

FIG. 7 is a plan view of a first slider 62 (second slider 64) that constitutes part of a four-point air belt system 60 that serves as the vehicle occupant restraint system according to a third example embodiment of the invention, which corresponds to FIG. 6. As shown in FIG. 7, the four-point air belt system 60 differs from the four-point air belt system 10 of the first example embodiment which has the first slider 38 and the second slider 40 that are on the whole ring-shaped in that the first slider 62 (second slider 64) serves as a connecting portion 62A (connecting portion 64A) that consists of a single band between the portion that loops around the guide main body 36A and the portion that retains the tongue plate 30 (buckle 32).

More specifically, one end of the first slider 62 in the seat width direction is made to serve as a slider portion 62B that is slidably looped around the guide main body 36A by feeding one end of the band-shaped member through the space C and then folding it back and sewing it to itself. Also, the other end of the first slider 62 in the seat width direction is made to serve as a tongue retaining portion 62C that retains the tongue plate 30 by passing the other end of the band-shaped member through the slit 42 in the tongue plate 30 and then folding it back and sewing it to itself. Similarly, as shown in parentheses in FIG. 7, one end of the second slider 64 in the seat width direction is made to serve as a slider portion 64B that is slidably looped around the guide main body 36A by feeding one end of the band-shaped member through the space C and then folding it back and sewing it to itself. Also, the other end of the second slider 64 in the seat width direction is made to serve as a buckle retaining portion 64C that retains the buckle 32 by passing the other end of the band-shaped member through the slit 42 in the tongue plate 30 and then folding it back and sewing it to itself.

That is, the first slider 62 can be understood as a structure having the ring-shaped slider portion 62B formed at one end of the connecting portion 62A and the ring-shaped tongue retaining portion 62C formed at the other end of the connecting portion 62A. Similarly, the second slider 64 can be understood as a structure having the ring-shaped slider portion 64B formed at one end of the connecting portion 64A and the ring-shaped tongue retaining portion 64C formed at the other end of the connecting portion 64A. The first slider 62 and the second slider 64 are structured such that the thickness direction (which may also be understood as the thickness of the band-shaped member) is generally the same as the longitudinal direction of the seat at least when (and just before) the tongue plate 30 and the buckle 32 are fastened together. The other structure of the four-point air belt system 60 is the same as the corresponding structure of the four-point air belt system 10.

Therefore, the four-point air bag system 60 of this third example embodiment is also able to obtain the same effects as the four-point air belt system 10 according to the first example embodiment by basically the same operation as that of the four-point air belt system 10.

Figure 8A:
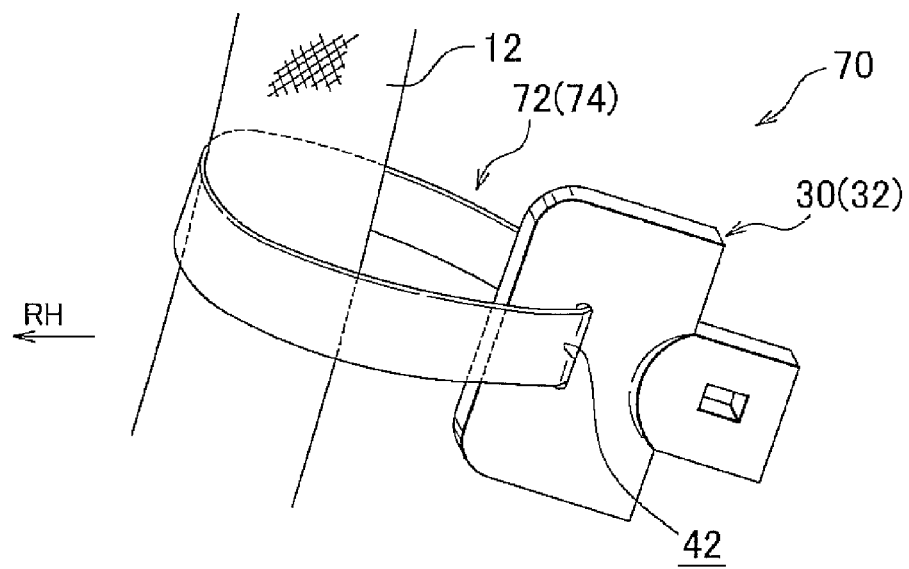
FIG. 8A is a perspective view of a slider which constitutes part of a four-point air belt system according to a fourth example embodiment of the invention as it appears in the fastened position (or the position when it is about to be fastened)

FIG. 8A is a perspective view of the main portions of a four-point air belt system 70 according to a fourth example embodiment of the invention. As shown in the drawing, the four-point air belt system 70 according to this fourth example embodiment differs from the four-point air belt system 10 according to the first example embodiment in that the slide guides 36 are omitted and the air belt 12 passes through a first slider 72 (second slider 74).

Figure 8B:
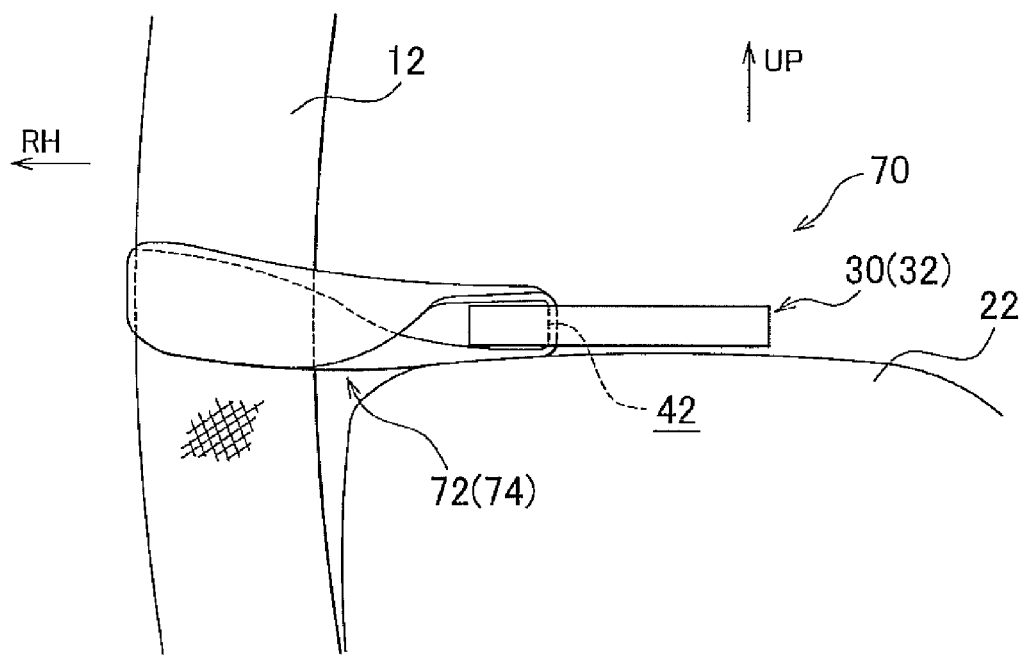
FIG. 8B is a perspective view of the slider which constitutes part of the four-point air belt system according to the fourth example embodiment of the invention as it appears hanging when unfastened.

With this four-point air belt system 70, when the air belts 12 are not being worn, the tongue plate 30 rests on the seat cushion 22 (such that the thickness direction is generally the same as the vertical direction of the seat), as shown in FIG. 8B. Meanwhile, the first slider 72 and the second slider 74 are structured such that the direction of thickness (which may also be understood as the thickness of the band-shaped member) is generally the same as the longitudinal direction of the seat at least when (as well as just before) the tongue plate 30 and the buckle 32 are fastened together, as shown in FIG. 8A. The other structure of the four-point air belt system 70 is the same as the corresponding structure of the four-point air belt system 10.

Therefore, the four-point air bag system 70 of this fourth example embodiment is also able to obtain the same effects as the four-point air belt 10 according to the first example embodiment by basically the same operation as that of the four-point air belt system 10, except for the effect of the sliding amounts of the tongue plate 30 and the buckle 32 being limited by the slide guides 36. Also, with the four-point air belt system 70, the first slider 72 and the second slider 74 are directly and slidably supported on the air belts 12 by having the air belts 12 pass through them, which enables them to slide a large amount. This makes it easier to accommodate occupants with large hips, for example.

Incidentally, in the example embodiments described above, each air bag 16 which constitutes part of each air belt 12 is such that the air bag 16 for the shoulder belt portion 12A and the air bag 16 for the lap belt portion 12B are integrally formed. However, the invention is not limited to this. For example, each of the air bags 16 may also be divided into an air bag 16 for the shoulder belt portion 12A and an air bag 16 for the lap belt portion 12B. In this case, the air bag 16 for the shoulder belt portion 12A and the air bag 16 for the lap belt portion 12B may share a common inflator 26, or may use different inflators 26. Also, the air bag 16 may instead be provided for only either the shoulder belt portion 12A or only the lap belt portion 12B, for example.

Also, in the example embodiments described above, the lower ends of the air belts 12 are supported by the rear portion of the seat cushion 22 via the anchors 24, but the invention is not limited to this. For example, the lower ends of the air belts 12 may also be supported by the vehicle body via the anchors 24.

Further, in the example embodiments described above, the retractors 18 are housed in the seatback 20, but the invention is not limited to this. For example, the retractors 18 may also be provided on the vehicle body, such as on an upper back panel (rear package tray) or on the floor behind the seatback 20. Moreover, although two retractors 18 are provided in the example embodiments described above, a single common retractor 18 may alternatively be provided.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A vehicle occupant restraint system comprising:
   left and right inflating belts, each of which is formed long in the vertical direction of a seat and in a belt shape enabling an occupant to be restrained, and inflates by receiving a supply of gas;
   a connecting portion that connects the middle portions of the left and right inflating belts together, the connecting portion including an engaging member and an engageable member;
   a first slider that is formed of a band-shaped member, the thickness direction of which is generally the same as the longitudinal direction of the seat, the first slider supported on an outer end side in the seat width direction by a support portion of one of the inflating belts in a manner so as to be able to slide in the longitudinal direction of the one inflating belt, and retaining the engaging member on an inner end side in the seat width direction; and
   a second slider that is formed of a band-shaped member, the thickness direction of which is generally the same as the longitudinal direction of the seat, the second slider supported on an outer end side in the seat width direction by a support portion of the other inflating belt in a manner so as to be able to slide in the longitudinal direction of the other inflating belt, and retaining the engageable member on an inner end side in the seat width direction.

2. The vehicle occupant restraint system according to claim 1, further comprising:
   a pair of slide guides which serve as the support portions of the left and right inflating belts and are provided parallel to the left and right inflating belts, respectively,
   wherein the outer end side of the first slider and the outer end side of the second slider in the seat width direction are respectively looped around the slide guides so as to be able to slide in the longitudinal direction of the slide guides.

3. The vehicle occupant restraint system according to claim 2, wherein:
   the left and right slide guides each have a guide main body that is parallel to the corresponding inflating belt, and a lower connecting portion which extends toward the corresponding inflating belt from a lower end portion of the guide main body in the vertical direction of the seat, the left and right slide guides each being rigid enough to maintain a predetermined angle between the corresponding lower connecting portion and the corresponding guide main body; and
   the lengths of the lower connecting portions of the slide guides are greater than the widths of the first and second sliders, respectively.

4. The vehicle occupant restraint system according to claim 1, wherein:
   the support portion is the inflating belt itself; and
   the outer end side of the first slider and the outer end side of the second slider in the seat width direction are respectively looped around the inflating belts so as to be able to slide in the longitudinal direction of the inflating belts.

\* \* \* \* \*